United States Patent [19]
Copas

[11] 3,890,689
[45] June 24, 1975

[54] HOLDING FRAME FOR CABLE SPLICING TOOLS AND METHOD FOR SPLICING CABLES

[76] Inventor: Donald D. Copas, 303 Fredericks Ln., Jefferson City, Mo. 65101

[22] Filed: Jan. 3, 1974

[21] Appl. No.: 430,486

[52] U.S. Cl. ............ 29/203 C; 29/203 J; 29/203 P; 29/559; 29/628
[51] Int. Cl. ... H01r 43/00; H05k 13/04; B23q 7/00
[58] Field of Search............ 29/203 P, 203 J, 203 C, 29/559, 592, 628

[56] References Cited
UNITED STATES PATENTS
| | | | |
|---|---|---|---|
| 3,713,214 | 1/1973 | Enright et al...................... | 29/203 P |
| 3,742,571 | 7/1973 | Brehm.............................. | 29/203 P |

*Primary Examiner*—Thomas H. Eager
*Attorney, Agent, or Firm*—Clarence A. O'Brien; Harvey B. Jacobson

[57] ABSTRACT

A holding frame for cable splicing tools has a framework including legs for mounting a support bar to which a conventional applicator is clamped and holding the support bar above an associated supporting surface. Appropriately fingered arms are also mounted on the support bar for retaining cable sections to be spliced, while a support bracket connected to the framework can support elements being spliced to a cable. Cable is spliced by movably mounting a splicing tool on the framework and retaining the cable sections to be spliced on the frame work while moving the tool sequentially toward each cable section and performing conventional splicing operations.

14 Claims, 9 Drawing Figures

PATENTED JUN 24 1975  3,890,689

SHEET 1

HOLDING FRAME FOR CABLE SPLICING TOOLS AND METHOD FOR SPLICING CABLES

BACKGROUND OF THE INVENTION

1. Field of the Invention

This invention relates generally to a tool holder, and particularly to a holding frame for cable splicing tools, and to a method for splicing cables.

2. Description of the Prior Art

The telephone industry has approached a need for high production cable splicing of buried cable and buried cable splicing in pedestals arranged above ground by developing several pieces of equipment capable of meeting the demand for high production cable splicing. A problem encountered with these known splicing tools, however, is that it is very difficult to use them for splicing of buried cable.

SUMMARY OF THE INVENTION

It is an object of the present invention to provide a holding frame for cable splicing tools.

It is another object of the present invention to provide a holding frame which permits cable splicing tools to be effectively utilized in high production splicing of buried telephone cable and buried cable in pedestals.

It is still another object of the present invention to provide an improved method for splicing cables.

These and other objects are achieved according to the present invention by providing a holding frame having: a framework; brackets for mounting a support bar on the framework; fingered arms mounted on the support bar for retaining cable sections to be spliced; and a clamp provided on the support bar for attaching a splicing tool to the framework and permitting the tool to splice the retained cable sections.

A support bracket is advantageously connected to the framework and arranged for temporarily supporting elements, such as terminal blocks and load coils, being spliced to a cable.

A preferred embodiment of the framework for a holding frame according to the present invention has two pairs of trestles, each trestle including a pair of longitudinally extending legs arranged crossing one another and a brace connected to and arranged extending between the legs. A longitudinally extending support member having a pair of spaced ends is arranged between the trestles.

A conventional cable splicing tool is advantageously mounted on the framework and arranged between a pair of cable section retaining arms adjustably mounted on the support bar and extending away from same. Each of the arms is provided with a finger arranged parallel to the support bar for holding the cable.

These together with other objects and advantages which will become subsequently apparent reside in the details of construction and operation as more fully hereinafter described and claimed, reference being had to the accompanying drawings forming a part hereof, wherein like numerals refer to like parts throughout.

DESCRIPTION OF THE PREFERRED EMBODIMENTS

Figure 1:
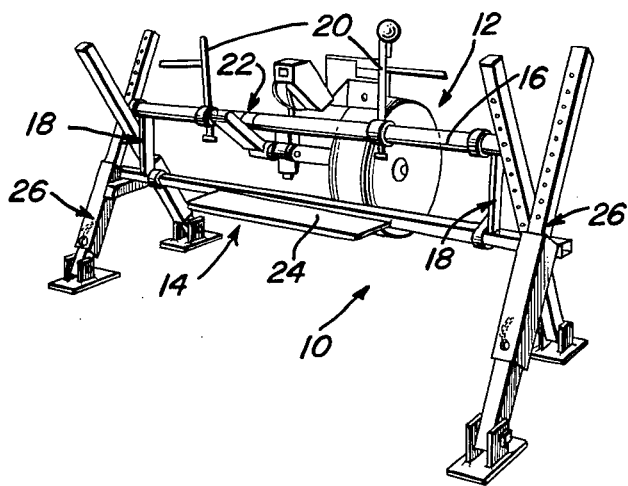
FIG. 1 is a perspective view showing a cable splicing tool mounted on a holding frame according to the present invention.

Referring now more particularly to FIG. 1 of the drawings, a holding frame 10 according to the present invention is shown mounting a conventional cable splicing tool 12. While any suitable applicator may be employed as tool 12 in combination with frame 10, the latter is specifically intended for mounting those applicators manufactured by AMP Incorporated, of Harrisburg, Pennsylvania under the manufacturer's designations of MA-6, MA-8, and AMP Hand Tool. These are very high production telephone cable splicing tools intended for splicing aerial and underground cable.

Holding frame 10 includes a framework 14 on which a support bar 16 is removably mounted as by a pair of brackets 18. A plurality of fingered arms 20 are mounted on support bar 16 for retaining cable sections to be spliced, while a clamp 22 is slidably arranged on bar 16 for attaching tool 12 to framework 14 and permitting tool 12 to splice cable sections retained by arms 20. While the number of arms 20 employed may vary in view of the specific application of frame 10, the illustrated pair of arms 20 is sufficient for most splicing situations. Further, a support bracket 24 is connected to framework 14 in a conventional manner, and is arranged for temporarily supporting elements to be described below. All of these elements are to be spliced to a cable.

Figure 2:
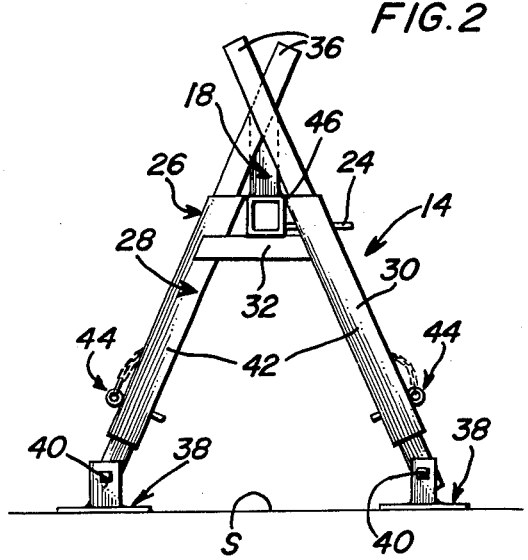
FIG. 2 is an end elevational view showing the holding frame of FIG. 1.
Figure 3:
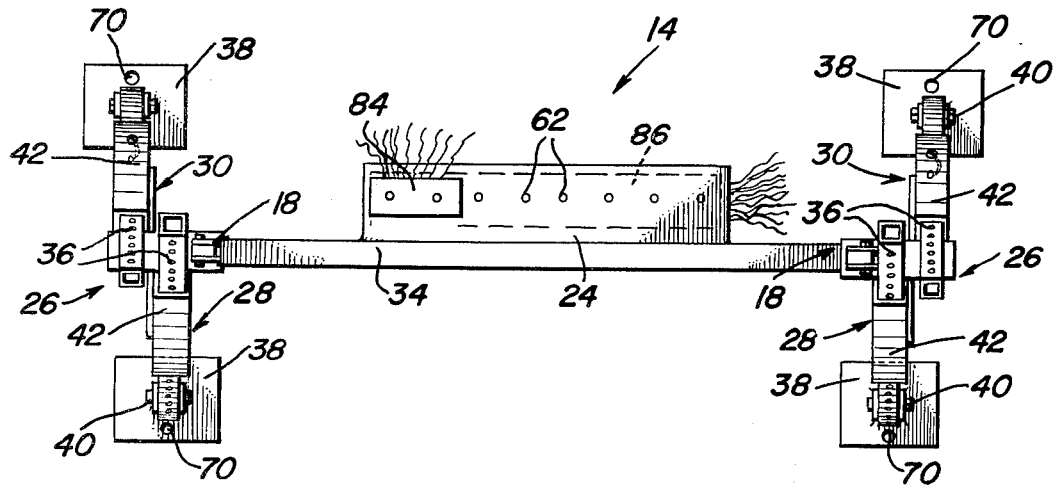
FIG. 3 is a top plan view showing the holding frame of FIGS. 1 and 2, but with the support bar removed.
Figure 4:
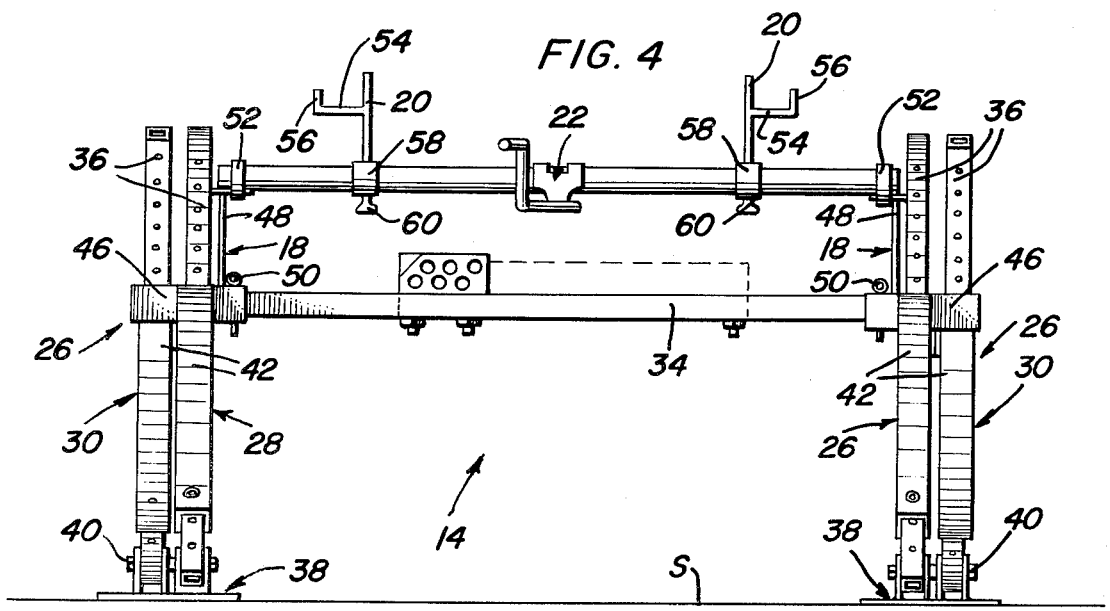
FIG. 4 is a side elevational view showing the holding frame of FIGS. 1 to 3.

Referring now to FIGS. 2 to 4 of the drawings, framework 4 is constructed from two pairs of trestles 26, each trestle including a pair of longitudinally extending legs 28 and 30 arranged crossing one another. A brace 32 is connected to and arranged extending between legs 28 and 30 for rigidifying the trestle. Further, the braces 32 provide a support for a support member which has spaced longitudinal end portions each of which is arranged adjacent a respective one of the trestles such that member 34 extends between the trestle and forms a stable framework in conjunction with the trestles. The preferred connection of member 34 to trestles 26 will be described below, as will a preferred construction of the trestles themselves.

Each leg 28, 30 is advantageously formed from a longitudinal leg member 36 provided with a plurality of holes. A foot pad 38 is pivotally connected to one end of member 36 in a conventional manner as by a pin 40 passing through mating bores provided in flange portions of the pad 38, while the member 36 itself is received in a sleeve 42. In this manner, leg member 36 is adjustably arranged in sleeve 42 and selectively lockable thereto as by a conventional cotter pin 44, and the like, arranged passing through an opening provided is sleeve 42 and into a selected one of the holes provided in leg member 36. Brace 32, as can best be seen from FIG. 3 of the drawings, is then actually connected to the sleeve 42 of each leg 28 and 30 forming a trestle 26. It will be appreciated, therefore, that by proper design sufficient rigidity can be obtained from the connection of brace 32 to sleeve 42 associated with the brace 32 to provide adequate strength for holding frame 10 to function in its intended manner. This is especially true when it is considered that framework 14 need only be approximately, for example, 1 to 2 feet high and 2½ feet long. Thus, the preferred construction of trestles 26 as described above provides a sufficiently rigid yet light-weight framework construction.

Each bracket 18 includes a collar 46 which may form part of an associated trestle 26, and in any event supports member 34 from its associated trestle 26 by forming a socket which receives an end of the member 34 and by being itself connected to the brace 32 of the associated trestle. As can be readily appreciated from the drawings, because of the association of the collar 46 of a bracket 18 with one of the trestles 26, each bracket 18 will be arranged adjacent one of the trestles 26 as well as being connected to an end of support member 34. A substantially L-shaped element 48 is connected as by its, for example, longest leg to collar 46 and is arranged extending from the collar such that its other leg, the shortest leg as illustrated in the drawings, forms a flange on which support bar 16 is removably arranged. Conventional cotter pins 50 may be employed for connecting the ends of support member 34 to collars 46 as by passing the pins 50 through holes provided in the collars and ends of member 34, while conventional hose clamps 52, and the like, may be used for removably connecting the end portions of support bar 16 to the flange portions of elements 48 which partially form brackets 18. In this manner, support bar 16 may be quickly, yet rigidly and removably connected to framework 14.

Each arm 20 has provided on the vertical shaft portion thereof arranged extending away from support bar 16 a finger 54 arranged parallel to the support bar 16 for providing a supporting surface for cable, and the like. A projection 56 may be provided at the end of each finger 54, as can best be seen from FIG. 9 of the drawings which shows in detail a preferred embodiment of an arm 20. At one end of arm 20 is connected in a suitable manner a collar 58 dimensioned for fitting on support bar 16 and being clampingly retained thereon as by a conventional wing-headed bolt 60 threaded into an opening in collar 58 provided with internal screw threads. Thus, arms 20 may be adjustably arranged on bar 16 and locked in a desired position best suited for a particular splicing operation.

As can best be seen from FIG. 3 of the drawings, support bracket 24 is a plate of generally rectangular configuration in plan, and provided with a plurality of apertures 62 arranged for receiving pins attached to elements to be supported on bracket 24 while they are being spliced to a cable. These elements may include terminal blocks, load coils, and the like, as are conventionally used in telephone line systems.

Figures 8, 9:
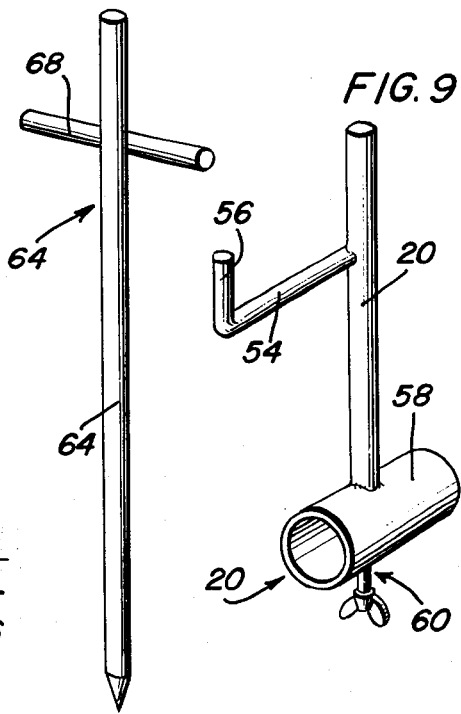
FIG. 8 is a perspective view showing a stake which may be used for anchoring a holding frame according to the present invention.
FIG. 9 is a perspective view showing a preferred embodiment of a fingered arm according to the present invention.

FIG. 8 of the drawings shows a stake 64 formed by a spike 66 provided with a crossarm 68 and which may be used to anchor framework 14 to a suitable surface S, such as the ground, by passing spike 66 through a respective opening 70 provided in foot pads 38 and inserting spike 66 into the surface S until crossarm 68 abuts the planar portion of the associate pad 38. Such staking will further increase the rigidity of holding frame 10.

To use holding frame 10, first prepare the cable by opening same and preparing it in the usual manner. Now assemble framework 14 by sliding leg members 36 into their associated sleeves 42 and locking same in a desired relationship with respect to one another by use of cotter pins 44. Now collars 46 may be placed over respective ends of support member 34 and secured with cotter pins 50. The applicator clamp 22, which may vary depending on the type of tool 12 employed, is arranged on support bar 16, and a, for example, pair of arms 20 are arranged flanking clamp 22 on bar 16 as by locking of the collars 58 of the arms onto bar 16. While arms 20 will usually be arranged on bar 16 in the manner shown in FIGS. 5 to 7 of the drawings, certain tools, such as the AMP MA-8, will require the arm 20 shown in the right-hand side of the figures to be arranged in reverse orientation from that shown. Now support bar 16 may be attached to the flange portions of brackets 18 as by conventional hose clamps 52. Once holding frame 10 is set up by the attachment of support bar 16 to brackets 18, the tool 12 to be employed for a particular splicing operation may be attached to its associated clamp 22. It will be understood that the manner of attachment of a tool 12 to clamp 22, as well as the particular design and construction of the clamp, will vary depending on the particular tool employed.

If the cable to be spliced is in a pedestal, holding frame 10 should be arranged so that the outward edge of bracket 24 is centered with respect to the center of the pedestal and is, for example, only about one inch from touching the pedestal. Frame 10 may be leveled by adjusting leg members 34 with respect to their associated sleeves 42 as described above. Frame 10 should not be raised any higher than necessary to level the frame. After frame 10 has been leveled, and assuming a suitable surface S, place the holding stakes 64 in openings 70 and drive stakes 64 into the surface S to anchor the holding frame.

Figure 6:
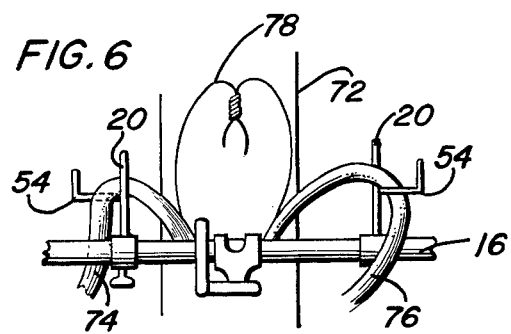
FIG. 6 is a fragmentary, partly schematic, elevational view showing another arrangement of cable sections on a holding frame according to the present invention.
Figure 7:
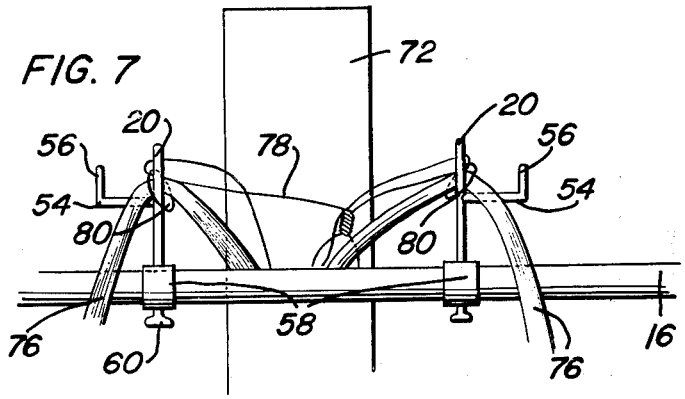
FIG. 7 is a fragmentary, partly schematic, elevational view similar to FIG. 6, but drawn to a larger scale and showing a further step in a cable splicing operation using a holding frame according to the present invention.
Figure 5:
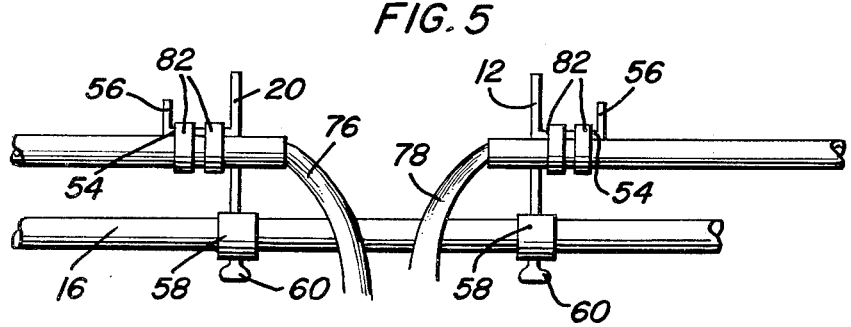
FIG. 5 is a fragmentary, partly schematic, elevational view showing one arrangement of cable sections arranged on a holding frame according to the present invention.

Once holding frame 10 has been set up and, if possible, anchored, adjust the arm 20 shown in the left-hand side of FIGS. 5 to 7 of the drawings so that it is about, for example, 3 inches to the left of pedestal 72 shown in FIGS. 6 and 7. Pick a group on the back side of the left-hand cable 74, and remove the binders (not shown) therefrom and place the cable on finger 54 as is shown in FIG. 6. Pick the same color binder group out of the right-hand cable 76, remove the binders, and place the cable on finger 54 of the right-hand arm 20 as is also shown in FIG. 6. Now take a pair of wires from the left-hand cable and a matching pair of wires from the right-hand cable, hold these two pairs up in pedestal 72, and adjust these wires until you have them as you will want them to lay in pedestal 72 when they are spliced. When this is done, twist the pairs together as indicated at 78 in FIG. 6. Remove the pairs of pedestal 72 and place them on arms 20 as shown in FIG. 7 of the drawings. Adjustment of, for example, the right-hand arm 20 may be required to assure that pair 78 is snug, but not too tight, just snug. Now tie the groups lying on arms 20 to the arms as designated 80 in FIG. 7. Place tool 12 in clamp 22 if the tool has not already been so placed. Now move clamp 22 and tool 12 to the left as shown in FIGS. 6 and 7 until it is about, for example, two inches from the left-hand arm 20. The cable is now ready to be spliced. This splicing may be done by, for example, splicing a 25-pair group and then moving the applicator to the right about, for example, two inches for the next 25-pair group. Each group will correspond to a, for example, connector bank. To splice on the right side of the pedestal 72, reverse the above steps by moving the tool 12 toward the right hand arm 20.

When splicing buried cable in a splice pit, extend legs 28 and 30 up until the cable can be fastened to arms 20 with, for example, hose clamps 82 as shown in FIG. 5 of the drawings. A normal opening can be made in the cable by properly adjusting arms 20. Now splicing may be performed in the conventional manner.

When terminal blocks 84 (FIG. 3) or a load coil 86, shown in broken lines in FIG. 3 of the drawings, are to be spliced to main cables, and the like, these blocks are first mounted on support bracket 24 by inserting pins provided on these elements into apertures 62 as appropriate. After splicing, the elements may be removed from bracket 24 and placed in, for example, a pedestal such as pedestal 72.

As will be appreciated from the above description and from the drawings, a holding frame 10 according to the present invention permits conventional splicing tools to be efficiently and conveniently employed to splice cable arranged either in a pedestal or buried under ground, and the like. The fingered arms 20 permit the cable sections to be spliced to be retained adjacent a rigidly mounted splicing tool so that the necessary relationship between the tool and cable sections can be easily maintained during the splicing operations. It will be readily appreciated that a holding frame according to the present invention greatly facilitates such splicing operations.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention.

What is claimed as new is as follows:

1. A holding frame for buried cables and pedestals for use in connection with cable splicing tools, comprising, in combination:
   a. a framework including a support bar and legs for holding the support bar above an associated supporting surface;
   b. means for mounting the support bar on the legs;
   c. means mounted on the support bar for retaining buried cables and pedestals to be spliced; and
   d. means provided on the support bar for attaching a splicing tool to the framework and permitting the tool to splice the retained cable sections.

2. A holding frame for cable splicing tools, comprising, in combination:
   a. a framework, the framework including two pairs of trestles, each trestle of the pair of trestles including a pair of longitudinally extending legs arranged crossing one another and a brace connected to and arranged extending between the legs, and a longitudinally extending support member having a pair of spaced ends, one of the ends arranged supported by the brace of one of the trestles and the other of the ends supported by the other of the trestles;
   b. means for mounting a support bar on the framework;
   c. means mounted on the support bar for retaining cable sections to be spliced; and
   d. means provided on the support bar for attaching a splicing tool to the framework and permitting the tool to splice the retained cable sections.

3. A structure as defined in claim 2, wherein each of the legs includes a leg member, a foot pad provided with an opening connected to the member at a one end thereof, and a sleeve, the leg member being adjustably arranged in the sleeve and selectively lockable thereto, and the brace being connected to the sleeve, and further including stakes arranged in the foot pad openings for anchoring the pads to a supporting surface.

4. A structure as defined in claim 3, wherein the means for mounting the support bar includes a pair of mounting brackets, one of the mounting brackets connected to the support member and to one of the trestles and the other of the mounting brackets connected to the support member and the other of the trestles, and means for connecting the support bar to the brackets, each mounting bracket comprising:
   i. a collar having a pair of legs arranged in perpendicular planes, and the collar arranged on the support member; and
   ii. an L-shaped element connected to the collar at a one end thereof and extending therefrom with the other leg thereof forming a flange.

5. A structure as defined in claim 4, wherein the means for retaining cable sections includes a plurality of arms adjustably mounted on the support bar and arranged extending away from same, each of the arms provided with a finger arranged parallel to the support bar.

6. A structure as defined in claim 5, further including a support bracket connected to the framework and arranged for temporarily supporting elements being spliced to a cable, the support bracket being a plate provided with a plurality of apertures arranged for receiving pins attached to the elements to be supported.

7. A holding frame for cable splicing tools, comprising, in combination:
   a. a framework;
   b. means for mounting a support bar on the framework, the means for mounting the support bar including a pair of mounting brackets, each mounting bracket comprising:
      i. a collar having a pair of legs arranged in perpendicular planes, and the collar arranged on the support member; and
      ii. an L-shaped element connected to the collar at one leg thereof and extending therefrom with the other leg thereof forming a flange;
   c. means mounted on the support bar for retaining cable sections to be spliced; and d. means provided on the support bar for attaching a splicing tool to the framework and permitting the tool to splice the retained table sections.

8. A holding frame for cable splicing tools, comprising, in combination:
   a. a framework;
   b. means for mounting a support bar on the framework;
   c. means mounted on the support bar for retaining cable sections to be spliced, the means for retaining cable sections including a plurality of arms adjustably mounted on the support bar and arranged extending away from same, each of the arms provided with a finger arranged parallel to the support bar; and
   d. means provided on the support bar for attaching a splicing tool to the framework and permitting the tool to splice the retained cable sections.

9. A holding frame for cable splicing tools, comprising, in combination:
   a. a framework;
   b. means for mounting a support bar on the framework;
   c. means mounted on the support bar for retaining cable sections to be spliced;
   d. means provided on the support bar for attaching a splicing tool to the framework and permitting the tool to splice the retained cable sections; and
   e. a support bracket connected to the framework and arranged for temporarily supporting elements being spliced to a cable, the support bracket being a plate provided with a plurality of apertures arranged for receiving pins attached to the elements to be supported.

10. A holding frame for cable splicing tools, comprising, in combination:
    a. a framework;
    b. means for mounting a support bar on the framework;
    c. means mounted on the support bar for retaining cable sections to be spliced;
    d. means provided on the support bar for attaching a splicing tool to the framework and permitting the tool to splice the retained cable sections; and
    e. a splicing tool mounted on the means for attaching.

11. A method for splicing cables, comprising the steps of:
    a. movably mounting a splicing tool on a holding frame;
    b. retaining on the holding frame cable sections to be spliced and positioning the sections adjacent the splicing tool; and
    c. moving the splicing tool on the holding frame sequentially toward each cable section to be spliced and performing conventional splicing operations.

12. A structure as defined in claim 2, wherein the means for mounting the support bar includes a pair of mounting brackets, one of the mounting brackets connected to the support member and to one of the trestles and the other of the mounting brackets connected to the support member and the other of the trestles, and means for connecting the support bar to the brackets, each mounting bracket comprising:
    i. a collar having a pair of legs arranged in perpendicular planes, and the collar arranged on the support member; and
    ii. an L-shaped element connected to the collar at a one end thereof and extending therefrom with the other leg thereof forming a flange.

13. A structure as defined in claim 2, wherein the means for retaining cable sections includes a plurality of arms adjustably mounted on the support bar and arranged extending away from same, each of the arms provided with a finger arranged parallel to the support bar.

14. A structure as defined in claim 2, further including a support bracket connected to the framework and arranged for temporarily supporting elements being spliced to a cable, the support bracket being a plate provided with a plurality of apertures arranged for receiving pins attached to the elements to be supported.

* * * * *